United States Patent [19]

Wataya

[11] Patent Number: 5,186,148
[45] Date of Patent: Feb. 16, 1993

[54] ABNORMALITY DETECTING DEVICE FOR AN AUTOMOBILE ENGINE

[75] Inventor: Seiji Wataya, Himeji, Japan

[73] Assignee: Mitsubishi Denki Kabushiki Kaisha, Tokyo, Japan

[21] Appl. No.: 857,951

[22] Filed: Mar. 26, 1992

[30] Foreign Application Priority Data

Apr. 15, 1991 [JP] Japan .................................. 3-082248

[51] Int. Cl.⁵ ............................................. F02M 51/00
[52] U.S. Cl. .................................................. 123/479
[58] Field of Search .................... 123/479, 480, 179.1; 364/431.11, 431.05, 431.09

[56] References Cited

U.S. PATENT DOCUMENTS

| | | | |
|---|---|---|---|
| 4,750,128 | 6/1988 | Honda et al. ............... | 364/431.11 |
| 4,958,611 | 9/1990 | Uchionami et al. ........ | 123/479 |
| 5,014,670 | 5/1991 | Mitsumoto .................. | 123/425 |
| 5,020,499 | 6/1991 | Kojiura et al. .............. | 123/479 |
| 5,107,432 | 4/1992 | Martinelli ................... | 364/431.09 |

*Primary Examiner*—Raymond A. Nelli
*Attorney, Agent, or Firm*—Sughrue, Mion, Zinn, Macpeak and Seas

[57] ABSTRACT

An abnormality detecting device for an automobile engine in which a controlling device nullifies an alarm to be generated on the basis of the judgment of abnormality in a case that the temperature of the fuel is determined to be higher than a predetermined value from an information of fuel temperature obtained by a temperature sensor after the engine has been re-started while the engine has been in an elevated temperature state after the stopping of the engine, or in a case that a predetermined time set by a timer has not been past after the re-starting of the engine.

1 Claim, 6 Drawing Sheets

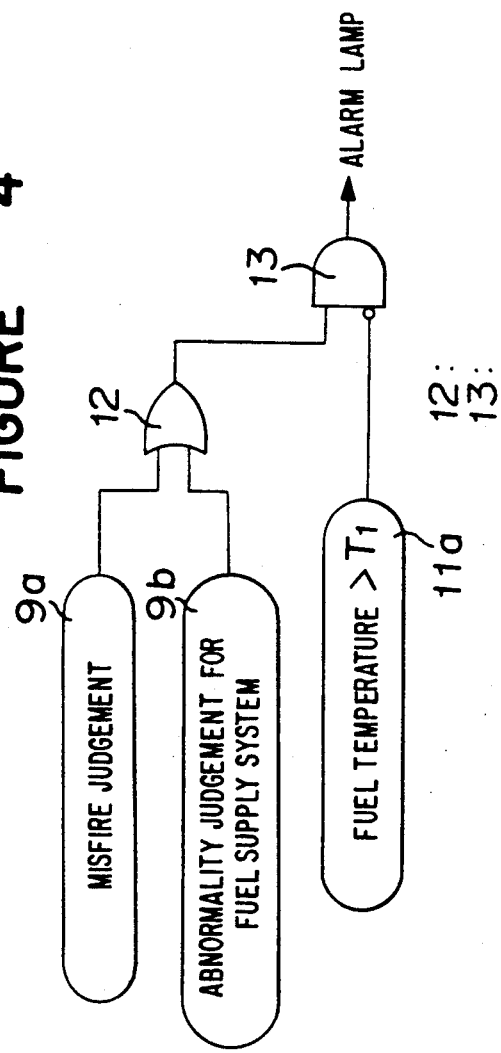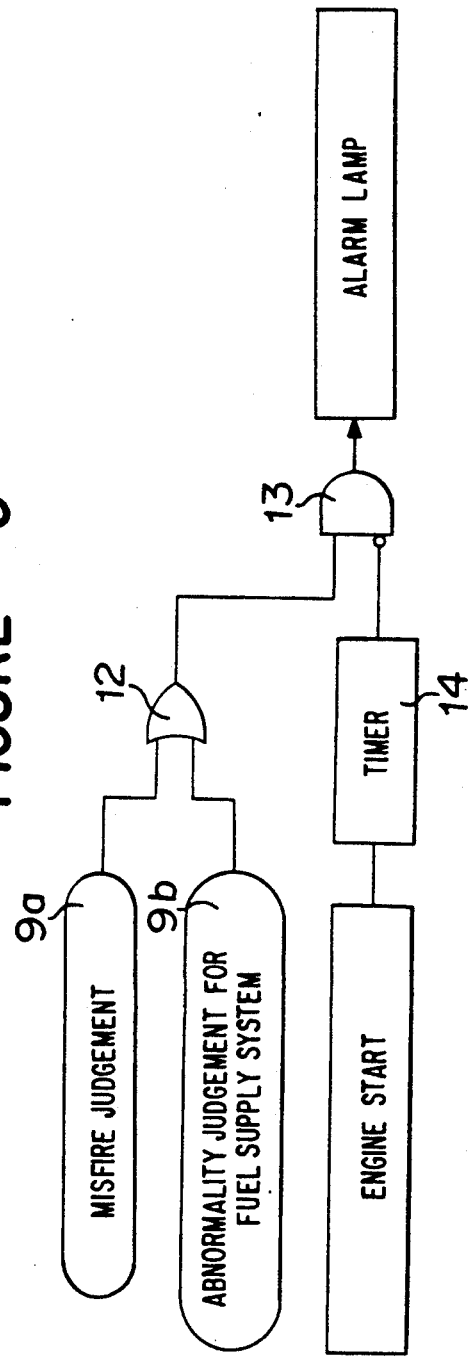

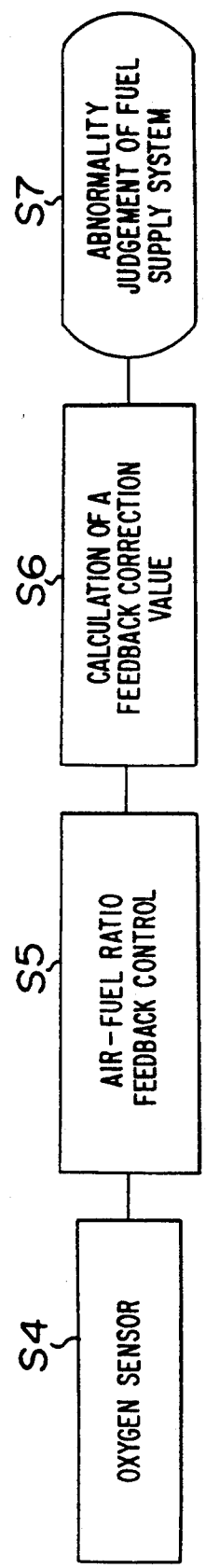
FIGURE 9
S4 OXYGEN SENSOR — S5 AIR-FUEL RATIO FEEDBACK CONTROL — S6 CALCULATION OF A FEEDBACK CORRECTION VALUE — S7 ABNORMALITY JUDGEMENT OF FUEL SUPPLY SYSTEM
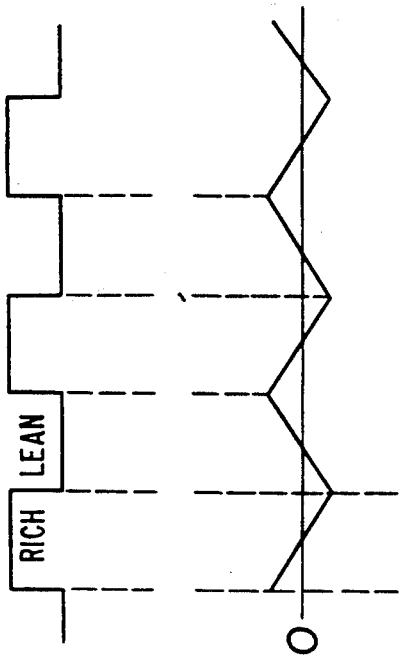
FIGURE 10(a) OUTPUT SIGNAL OF OXYGEN SENSOR
FIGURE 10(b) AIR-FUEL RATIO CORRECTION QUANTITY (NORMAL STATE)
FIGURE 10(c) AIR-FUEL RATIO CORRECTION QUANTITY (ABNORMAL STATE)

ABNORMALITY DETECTING DEVICE FOR AN AUTOMOBILE ENGINE

BACKGROUND OF THE INVENTION

1. Field of the Invention

The present invention relates to an abnormality detecting device for an automobile engine capable of detecting a misfire or abnormality in an air-fuel ratio in the engine to thereby generate an alarm.

2. Discussion of Background

There have been proposed to control precisely an air-fuel ratio in an automobile engine and to use a three component catalyst in order to purify harmful gas discharged from the engine. Further, there has been increasing such demand that when the quality of exhaust gas becomes worse from the initial value by any cause, detection of such state is made; an alarm is generated, and repairing is carried out to return into a normal state. A conventional technique which was proposed to meet such requirements will be described.

FIG. 6 is a diagram showing an abnormality detecting device for an automobile engine to detect abnormality in exhaust gas discharged from an automobile engine. In FIG. 6, reference numeral 1 designates an engine, numeral 2 designates an intake air pipe, numeral 3 designates an injector for injecting fuel to the intake air pipe 2, numeral 4 designates an airflow sensor for measuring a load to the engine (e.g. an intake air quantity), numeral 5 designates a revolution speed sensor for generating pulses in response to a revolution speed of the engine, numeral 6 designates an exhaust pipe, numeral 7 designates a catalyst to purify exhaust gas, numeral 8 designates an oxygen sensor to detect a component of the exhaust gas, and numeral 9 designates a controlling device which operates a required fuel quantity on the basis of various input data to thereby control the pulse width of a driving signal to the injector 3, and performs abnormality judgment to a fuel supply system whereby an alarm lamp 10 is operated when the fuel supply system is detected to be abnormal.

The operation of the conventional abnormality detecting device will be described. Information signals from the airflow sensor 4 and the revolution speed sensor 5 are inputted as major parameters to the controlling device 5 where a basic fuel quantity is calculated. Further, the basic fuel quantity is corrected depending on a rich or lean state of the exhaust gas, which is indicated by the oxygen sensor 8. The detail explanation of the above mentioned operations is omitted since they are well-known techniques.

Now, detection of abnormality in the engine, which relates to the present invention, will be described in detail. The airflow sensor 4 is used as a detecting means to detect a load to the engine. In order to detect a load to the engine, another information such as a negative pressure in the intake air pipe or a throttle valve opening degree may be used.

The present invention concerns the detection of an abnormal state occurring in an automobile engine, particularly, the detection of abnormality in a fuel supply system or an ignition system for the engine, more specifically, the detection of a misfire or abnormality in an air-fuel ratio which deteriorates the quality of exhaust gas discharged from the engine.

FIG. 7 is a flowchart showing an example of the detection of a misfire. A pulse signal outputted from the revolution speed sensor 5 is received in the controlling device 9 at step S1. A period of pulses is measured from the input signal at step S2. The presence or absence of a misfire is judged on the basis of values which indicate changes of angular speed at step S3.

As shown in FIG. 8a which shows a period of pulses in the signal of the revolution speed sensor 5 in a normal state, when there is no misfire, a torque of each of cylinders #1, #2, #3 and #4 has the same level, whereby each period assumes substantially the same value. However, when a misfire takes place, for instance, at the third cylinder #3 due to the stained spark plug or a defect in the ignition coil or the high voltage cord, the third cylinder #3 doesn't produce any torque. Accordingly, the period of the pulses becomes irregular as shown in FIG. 8b, whereby it is possible to detect the occurrence of a misfire. The measurement of the period of the pulses and the judgment of misfiring are carried out by a microcomputer (not shown) in the controlling device 9.

FIG. 9 is a flowchart showing an example of processes to detect abnormality in an air-fuel ratio. The concentration of oxygen contained in exhaust gas is detected with use of the oxygen sensor 8 at step S4; the controlling device 9 performs a feedback control for the air-fuel ratio in response to a detection quantity of the oxygen concentration by the oxygen sensor 8, whereby a feedback correction quantity is calculated at step S6.

FIG. 10a is a diagram showing an output signal from the oxygen sensor 8. FIG. 10b is a diagram showing an air-fuel ratio correction quantity in a normal operating state. When the air-fuel ratio deviates from a regular range of value due to an abnormal state of the airflow sensor 4, the injector 3 or the controlling device 9, the air-fuel ratio correction quantity assumes a state in which the average value is in an off-set state (Ce) as shown in FIG. 10c, which shows a large value in comparison with a value: Ce≈0 which is in a normal state as shown in FIG. 10b.

When the off-set value Ce exceeds a predetermined value (e.g. 30%), a judgment that abnormality takes place in the fuel supply system is made by the controlling device 9 at step S7.

As described above, according to the conventional abnormality detection device, a misfire due to a faulty operation of the spark plug or the ignition coil in the ignition system or abnormality in air-fuel ratio which is resulted from an abnormal control of the injector due to a faulty operation of the airflow sensor 4, the injector 3 or the control device 9 are detected, and an alarm is generated whereby a driver can recognize that the exhaust gas from the engine becomes deteriorated. Then, the driver can correct the abnormal state into a normal state.

In the conventional abnormality detecting device for an automobile engine having the above-mentioned construction, even when an abnormal state does not take place in a structural component such as the airflow sensor 4, the injector 3, the spark plug, the ignition coil and so on, air bubbles are contained in the fuel ejected from the injector 3 in a case that supply of fuel becomes temporarily short. As a concrete example, it occurs when the engine is in a high temperature state after the engine has been stopped and again started. As a result, fuel to be supplied becomes short, and the air-fuel ratio exhibits a substantially lean state. In this case, judgment of misfire or abnormality in air-fuel ratio is made. Since the above-mentioned phenomenon is not abnormality in the component but a temporary shortage of fuel after the re-starting of the engine, it is improper to provide an alarm to the driver.

SUMMARY OF THE INVENTION

It is an object of the present invention to provide an abnormality detecting device for an automobile engine which minimizes an erroneous judgment of abnormality in the case that components in the fuel supply system or the ignition system normally operates; thus, an erroneous judgment can be prevented.

The foregoing and other objects of the present invention have been attained by providing an abnormality detecting device for an automobile engine which comprises an airflow sensor for detecting a load to an engine, a revolution speed sensor for generating pulses in response to a revolution speed of the engine, an oxygen sensor for detecting the components of exhaust gas from the engine, injectors for injecting fuel to an air intake pipe, and a controlling device which measures a period of the pulses of the revolution speed sensor to thereby judge the presence or absence of misfiring based on a value indicating a change of angular speed or the like, and/or judges abnormality in a fuel supply system which is caused by -abnormality in the airflow sensor and the injectors, and which nullifies an alarm to be generated on the basis of the judgment of abnormality in a case that the temperature of the fuel is determined to be higher than a predetermined value from an information of fuel temperature obtained by a temperature sensor after the engine has been re-started while the engine has been in an elevated temperature state after the stopping of the engine, or in a case that a predetermined time set by a timer has not been past after the re-starting of the engine.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a logic diagram of a circuit which prohibits the operation of an alarm lamp which is actuated in an abnormal state of the fuel supply system or an erroneous judgment of misfire, which is applied to the detecting device shown in FIG. 1;

FIG. 5 is a logic diagram of a circuit which prohibits alarming within several minutes after the restarting of the engine, which is applied to the detecting device shown in FIG. 1;

FIG. 9 is a flowchart to explain processes of abnormality judgment in the fuel supply system by the abnormality detecting device shown in FIG. 6; and FIGS. 10A-10C represent a time chart to explain the detection of abnormality in the fuel supply system by the abnormality detecting device shown in FIG. 6.

DETAILED DESCRIPTION OF THE PREFERRED EMBODIMENTS

Figure 1:
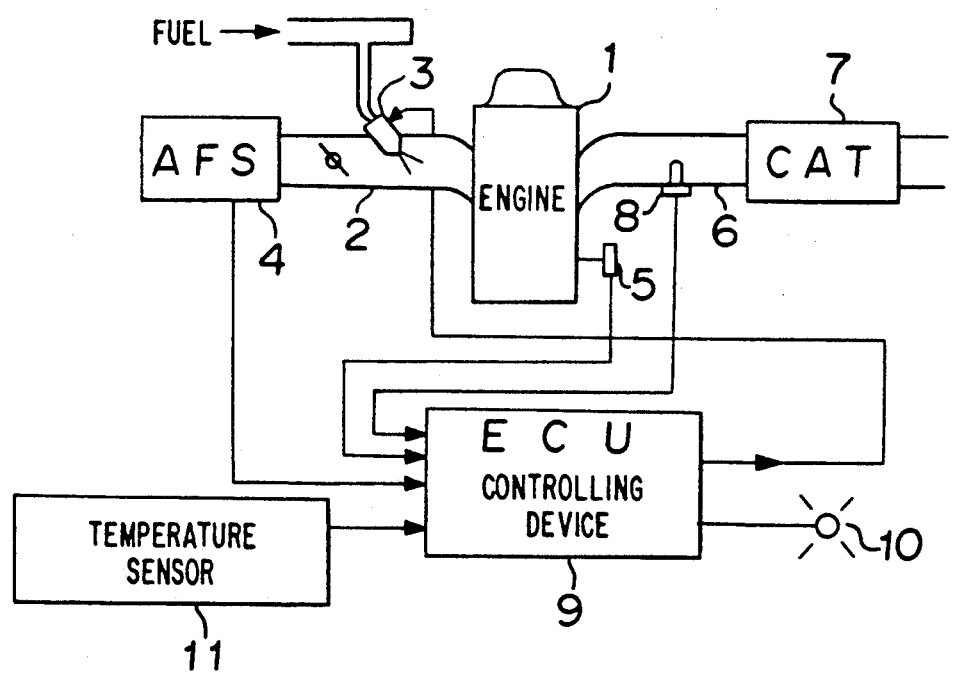
FIG. 1 is a diagram of an embodiment of the abnormality detecting device according to the present invention.
Figure 6:
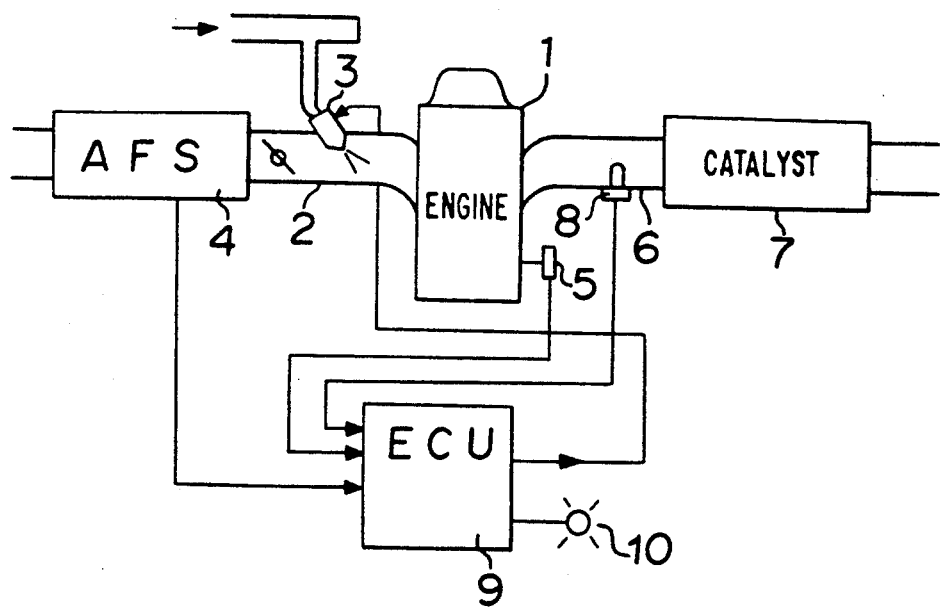
FIG. 6 is a diagram showing a conventional abnormality detecting device for an automobile engine.
Figure 7:
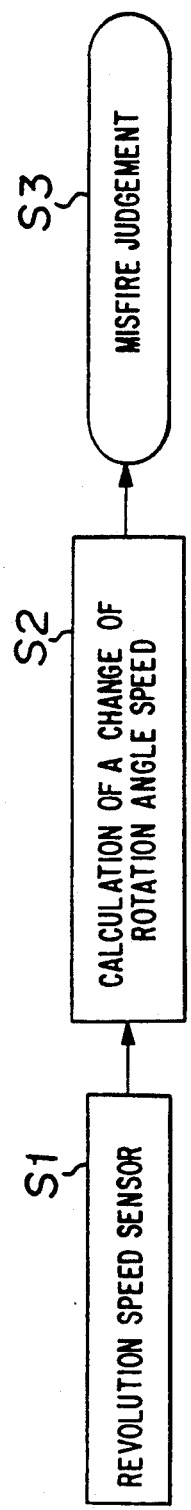
FIG. 7 is a flowchart to explain processes of misfire judgment in the conventional abnormality detecting device shown in FIG. 6.
Figure 8A:
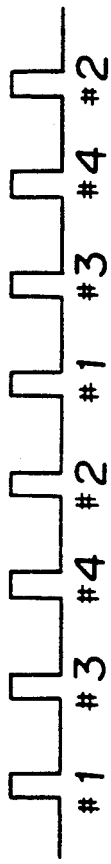
FIGS. 8A and 8B are waveforms diagram for misfire judgment by the abnormality detecting device shown in FIG. 6.
Figure 8B:

Referring to the drawings wherein the same reference numerals designate the same or corresponding parts throughout the several views, and more particularly to FIG. 1 thereof, there is shown a diagram of an embodiment of the abnormality detecting device for an automobile engine of the present invention. The abnormality detecting device shown in FIG. 1 is the same as that in FIG. 6 provided that a temperature sensor 11 is added. The temperature sensor 11 is disposed at a position on or near the engine main body or the cooling water system or the fuel supply system, and an output signal detected by the temperature sensor 11 is supplied to the controlling device 9.

Figure 2:
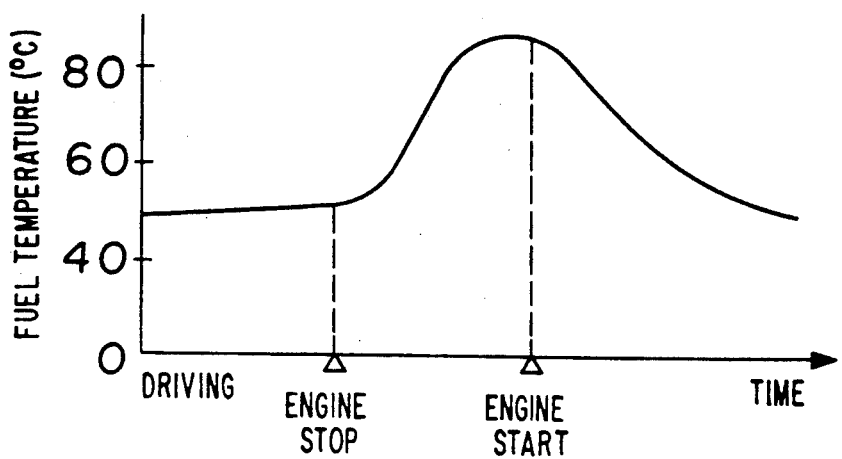
FIG. 2 is a characteristic diagram showing a relation of fuel temperature to time to explain the operation of the detecting device shown in FIG. 1.

The operation of the abnormality detecting device of the first embodiment will be described. Generally, an automobile engine is cooled by air during cruising. Accordingly, temperature rise in the cruising is relatively low. However, when the engine is stopped, the exhaust pipe 6 and the engine main body are not cooled, and in particular, when outdoor temperature is high or when the automobile is stopped after a high load cruising, the temperature of the engine main body, the fuel pipe and the injector portion is rapidly increased as shown in the diagram of FIG. 2. For instance, the temperature of fuel near the injector 3 reaches more then 80° C. about 20 minutes after the stopping of the engine.

Figure 3:
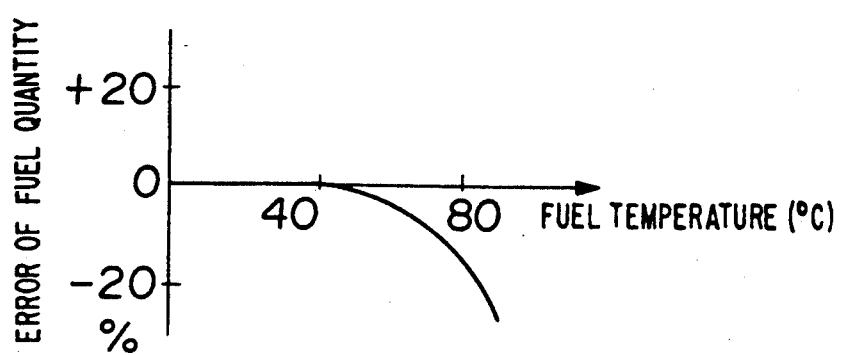
FIG. 3 is a characteristic diagram showing a relation of error of fuel quantity to fuel temperature to explain the operation of the detecting device shown in FIG. 1.

Accordingly, when the engine is re-started when the fuel is in a high temperature state, a much amount of air bubbles are contained in the fuel in several minutes until the fuel is circulated so that the temperature decreases. Accordingly, even when the re-starting is possible, the air-fuel ratio after the re-starting exhibits a remarkable lean state as shown in the characteristic diagram of FIG. 3, whereby misfires randomly occur or the correction value Ce for air-fuel ratio, which is based on the signal of the oxygen sensor 8, becomes large, whereby a judgment of misfire or abnormality in the air-fuel ratio is made.

In the present invention, since the temperature of fuel is directly or indirectly detected with use of the temperature sensor 1, an alarm which is to be generated on the basis of a judgment of abnormality is prohibited when the temperature detected is larger than a predetermined value T1 as shown in the logic diagram of FIG. 4. Namely, in FIG. 4, when a detection temperature by the temperature sensor 11 is a predetermined temperature T1 or lower, an instruction of prohibition is not given to a prohibition gate 13. Accordingly, when a judgment of misfire is made by the controlling device 9, a misfire judgment signal 9a is generated to operate an alarm lamp (not shown) through an OR circuit 12 and the prohibition gate 13.

Similarly, when a judgment of abnormality in the fuel supply system is made by the controlling device 9, a fuel supply system abnormality judgment signal 9b is generated to operate the alarm lamp through the OR circuit 12 and the prohibition gate 13. However, when the detection temperature of the fuel detected by the temperature sensor 11 exceeds the predetermined temperature T1, a prohibition signal 11a is inputted to the prohibition input terminal of the prohibition gate 13 so that the operation of the alarm lamp is prohibited by the misfire judgment signal 9a or the fuel supply system abnormality judgment signal 9b generated from the prohibition gate 13.

As another method of the prohibition of the abnormality judgment, the misfire judgment or the fuel supply system abnormality judgment itself can be nullified.

Although it is most preferable to dispose the temperature sensor 11 at a position, which allows direct detection of the temperature of fuel, near the injector 3, the temperature of the fuel can be estimated by using a temperature sensor for detecting the temperature of cooling water for the engine or a temperature sensor for detecting the temperature of intake air. Accordingly, these temperature sensors may be used in consideration of easiness of fitting or cost for fitting.

FIG. 5 is a logic diagram showing another embodiment to prohibit an alarm for indicating abnormality. In this embodiment, the alarm is prohibited without using the temperature sensor 11 in several minutes after the starting of the engine during which the temperature of the fuel is sufficiently high.

As shown in FIG. 5, a timer 14 which is actuated for a predetermined time (e.g. 5 minutes) at the same time of the re-starting of the engine is connected at the prohibition input terminal side of the prohibition gate 13 so that the operation of the alarm lamp is prohibited during the actuation of the timer 14. A time to be set by the timer 14 may be changed depending on operational conditions (load, speed) before the stopping of the engine and the temperature of open air.

Logic operations or timer control with use of the temperature sensor 11 can be easily performed by an electronic circuit or a microcomputer.

Thus, in accordance with the present invention, a judgment of misfiring or abnormality in the fuel supply system (air-fuel ratio) is nullified or an alarm to be generated in response to the judgments is prohibited when the temperature of fuel near the injector is high. Accordingly, an erroneous judgment of abnormality is not provided when the structural components of the fuel supply system or the ignition system are normally actuated, and unnecessary judgments can be prevented.

Obviously, numerous modifications and variations of the present invention are possible in light of the above teachings. It is therefore to be understood that within the scope of the appended claims, the invention may be practiced otherwise than as specifically described herein.

What is claimed is:

1. An abnormality detecting device for an automobile engine which comprises:
    an airflow sensor for detecting a load to an engine,
    a revolution speed sensor for generating pulses in response to a revolution speed of the engine,
    an oxygen sensor for detecting the components of exhaust gas from the engine,
    injectors for injecting fuel to an air intake pipe, and
    a controlling device which measures a period of the pulses of the revolution speed sensor to thereby judge the presence or absence of misfiring based on a value indicating a change of angular speed or the like, and/or judges abnormality in a fuel supply system which is caused by abnormality in the airflow sensor and the injectors, and which nullifies an alarm to be generated on the basis of the judgment of abnormality in a case that the temperature of the fuel is determined to be higher than a predetermined value from an information of fuel temperature obtained by a temperature sensor after the engine has been re-started while the engine has been in an elevated temperature state after the stopping of the engine, or in a case that a predetermined time set by a timer has not been past after the re-starting of the engine.

* * * * *